United States Patent [19]

Angel et al.

[11] Patent Number: 5,066,715
[45] Date of Patent: Nov. 19, 1991

[54] AQUEOUS SYNTHETIC RESIN DISPERSIONS

[75] Inventors: Maximilian Angel, Mutterstadt; Andreas Einwiller, Mannheim, both of Fed. Rep. of Germany

[73] Assignee: BASF Aktiengesellschaft, Ludwigshafen, Fed. Rep. of Germany

[21] Appl. No.: 502,236

[22] Filed: Mar. 30, 1990

[30] Foreign Application Priority Data

Apr. 12, 1989 [DE] Fed. Rep. of Germany ....... 3911943

[51] Int. Cl.$^5$ ............................................. C08L 33/24
[52] U.S. Cl. ................... 524/812; 524/555; 524/813
[58] Field of Search ............... 524/812, 457, 555, 813

[56] References Cited

U.S. PATENT DOCUMENTS 4,289,676 9/1981 Czauderna et al. ............. 526/304
4,743,498 5/1988 Kedrowski et al. ............. 428/288

FOREIGN PATENT DOCUMENTS 281083 7/1988 European Pat. Off. .

*Primary Examiner*—Joseph L. Schofer
*Assistant Examiner*—Jeffrey T. Smith
*Attorney, Agent, or Firm*—Oblon, Spivak, McClelland, Maier & Neustadt

[57] ABSTRACT

Aqueous synthetic resin dispersions are obtainable by single-stage emulsion copolymerization of a monomer mixture of a) from 35 to 99.5% by weight of one or more vinyl esters of aliphatic monocarboxylic acids of not more than 6 carbon atoms (monomers A), b) from 0.5 to 10% by weight of one or more monomers of the general formula I (monomers B)

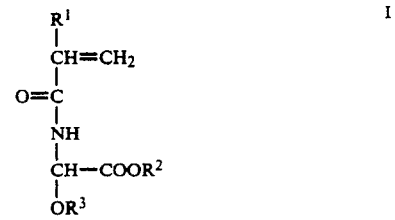

where $R^1$, $R^2$ and $R^3$ independently of one another are each hydrogen or methyl, c) from 0 to 64.5% by weight of one or more of the monomers acrylonitrile, styrene and esters of an $\alpha,\beta$-monoethylenically unsaturated monocarboxylic acid of 2 to 5 carbon atoms and an alkanol of 1 to 8 carbon atoms (monomers C) and d) from 0 to 5% by weight of one or more $\alpha,\beta$-monoethylenically unsaturated mono- and/or dicarboxylic acids of 3 to 5 carbon atoms and/or their unsubstituted amides (monomers D), the weights of the monomers A, C and D being chosen within the stated limits so that a polymer composed only of these monomers would have a glass transition temperature of $-50°$ to $+60°$ C.

These dispersions are suitable as binders for the production of nonwovens from mats.

3 Claims, No Drawings

AQUEOUS SYNTHETIC RESIN DISPERSIONS

The present invention relates to an aqueous synthetic resin dispersion, obtainable by single-stage emulsion polymerization of a monomer mixture consisting of a) from 35 to 99.5% by weight of one or more vinyl esters of aliphatic monocarboxylic acids of not more than 6 carbon atoms (monomers A), b) from 0.5 to 10% by weight of one or more monomers of the general formula I (monomers B)

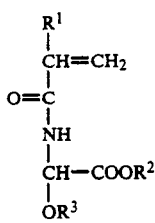

where $R^1$, $R^2$ and $R^3$ independently of one another are each hydrogen or methyl, c) from 0 to 64.5% by weight of one or more of the monomers acrylonitrile, styrene and esters of an $\alpha,\beta$-monoethylenically unsaturated monocarboxylic acid of 2 to 5 carbon atoms and an alkanol of 1 to 8 carbon atoms (monomers C) and d) from 0 to 5% by weight of one or more $\alpha,\beta$-monoethylenically unsaturated mono- and/or dicarboxylic acids of 3 to 5 carbon atoms and/or their unsubstituted amides (monomers D), the weights of the monomers A, C and D being chosen within the stated limits so that a polymer composed only of these monomers would have a glass transition temperature of $-50°$ to $+60°$ C.

The present invention furthermore relates to a process for the preparation of these dispersions and the use of these dispersions as binders in the production of nonwovens from mats.

Nonwovens are all sheet-like textile structures which are produced by consolidating relatively loose accumulations of individual fibers (mats). The consolidation of mats by impregnation or coating with aqueous synthetic resin dispersions and subsequent evaporation of the water is generally known. EP-A 19169 relates to aqueous dispersions of copolymers which contain repeating units of the general formula II

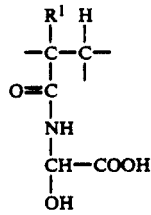

and are composed of not less than 85% by weight of acrylates and/or methacrylates of alkanols of 1 to 8 carbon atoms and/or vinyl esters of acetic or propionic acid and/or vinyl chloride, where up to 40% by weight of the stated monomers may be replaced by acrylonitrile, styrene or butadiene, and from 0 to 5% by weight of $\alpha,\beta$-monoolefinically unsaturated mono- and/or dicarboxylic acids of 3 to 5 carbon atoms and/or their amides.

These dispersions are recommended are recommended as binders for the production of nonwovens from mats to obtain nonwovens which on the one hand are resistant to washing and cleaning and on the other hand do not release any formaldehyde during their processing and use. The only dispersions disclosed by way of example are those of copolymers which do not contain any vinyl esters of aliphatic monocarboxylic acids as polymerized units. However, the performance characteristics of the said dispersions are unsatisfactory since mats consolidated using these dispersions give nonwovens which cannot be heat-sealed. However, the combination of heat-sealing properties and resistance to washing and cleaning is important particularly when nonwovens are used in the hygiene sector, where a laminate of nonwoven hygiene fabrics with themselves or with other substrates without the use of additional adhesives is frequently required.

The earlier application Ser. No. P 37 34 752.7 relates to aqueous dispersions of copolymers which are composed of from 85 to 99.5% by weight of $\alpha,\beta$-monoolefinically unsaturated carboxylates of 3 to 12 carbon atoms, from 0.5 to 10% by weight of the monomers B and from 0 to 5% by weight of the monomers D, and up to 35% by weight of the incorporated $\alpha,\beta$-monoolefinically unsaturated carboxylates may be vinyl monocarboxylates. These dispersions are recommended as binders for the production of nonwovens from mats, in order to obtain nonwovens which are resistant to washing and cleaning and which do not release any formaldehyde during their processing and use and also have heat-sealing properties. However, the disadvantage of these dispersions is that they have to be produced by a complex emulsion polymerization process in two stages involving different monomer compositions.

The aqueous synthetic resin dispersions prepared in Comparative Experiments B and K of the earlier application Ser. No. P 37 34 752.7 in a single-stage emulsion polymerization process and containing copolymers which contain 25% by weight of vinyl acetate (Comparative Experiment B) or 9% by weight of vinyl propionate (Comparative Experiment K) as polymerized units give nonwovens whose heat-sealing properties are not completely satisfactory when they are used as binders for consolidating mats.

U.S. Pat. No. 4,743,498 relates to aqueous synthetic resin dispersions whose copolymers contain from 50 to 99 mol % of vinyl acetate, from 0 to 50 mol % of acrylates or methacrylates, from 0 to 10 mol % of acrylic or methacrylic acid, from 1 to 50 mol % of alkyl acrylamidoglycolate alkyl ethers and from 0 to 20 mol % of hydroxyethyl acrylate and/or acrylamide as polymerized units. Because of their particularly advantageous heat-curability, which takes place without release of formaldehyde, these dispersions are recommended as binders for the production of nonwovens from mats. The copolymer of the embodiment disclosed by way of example (Example X) contains 15% by weight of methyl acrylamidoglycolate methyl ether.

EP-A 281 083 discloses aqueous synthetic resin dispersions whose films have high blocking resistance and which are likewise suitable as binders in nonwovens. The associated copolymers contain essentially vinyl acetate, from 1 to 20% by weight of ethylene, from 0.5 to 15% by weight, based on vinyl acetate, of acrylamidoglycollic acid or related compounds and from 0.1 to 5% by weight of an acrylamide.

It is an object of the present invention to provide synthetic resin dispersions which are obtainable in a simple manner and are particularly suitable for consolidating mats, nonwovens resistant to washing and cleaning being obtained, which do not release any formaldehyde during their processing and which additionally have satisfactory heat-sealing properties.

We have found that this object is achieved by the aqueous synthetic resin dispersions defined at the outset.

The monomers A are preferably used in an amount of from 35 to 75% by weight, based on the total amount of the monomers, vinyl acetate and vinyl propionate being preferred. The monomers B are preferably copolymerized in an amount of from 2 to 5% by weight, based on the total amount of monomers, acrylamidoglycollic acid and methacrylamidoglycollic acid being preferred. Particularly suitable monomers C are the esters of acrylic acid and of methacrylic acid, the acrylates being preferred. Particularly preferred acrylates are methyl acrylate, ethyl acrylate, isopropyl acrylate, n-butyl acrylate, isobutyl acrylate and 2-ethylhexyl acrylate, while preferred esters of methacrylic acid are n-butyl methacrylate, isobutyl methacrylate and 2-ethylhexyl methacrylate. While the monomers A and B are obligatory components of the novel emulsion copolymers, the monomers C are merely auxiliary monomers This also applies to the monomers D, of which acrylic and methacrylic acid are preferably incorporated, as well as maleic and itaconic acid and the mono- or diamides derived from these carboxylic acids. In general, the weights of the monomers A, C and D, based on the total amount of the monomers to be polymerized, are chosen with the aid of the Fox relationship, in such a way that a polymer composed only of these monomers would have a glass transition temperature of from $-50°$ to $+60°$ C., preferably from $-50°$ to $-5°$ C. According to Fox (T. G. Fox, Bull. Am. Phys. Soc. (Ser. II) 1 (1956), 123, the following is a good approximation for the glass transition temperature of copolymers:

$$\frac{1}{Tg} = \frac{X^1}{Tg^1} + \frac{X^2}{Tg^2} + \ldots \frac{X^n}{Tg^n}$$

where $X^1, X^2, \ldots, X^n$ are the mass fractions of the monomers $1, 2, \ldots, n$ and $Tg^1, Tg^2, \ldots, Tg^n$ are the glass transition temperatures, in degrees Kelvin, of the polymers composed only of one of the monomers 1, 2, ... or n. The glass transition temperatures of these homopolymers of the abovementioned monomers I, II and IV are known and are described in, for example, J. Brandrup and E. H. Immergut, Polymer Handbook, 1st edition, J. Wiley, New York 1966 and 2nd edition, J. Wiley, New York 1975.

The novel synthetic resin dispersions are prepared by a single-stage polymerization of the particular monomers in an aqueous medium under the known conditions of emulsion polymerization in the presence of water-soluble free radical initiators and emulsifiers and in the presence or absence of protective colloids and regulators as well as further assistants.

Particularly suitable water-soluble polymerization initiators are peroxides, such as hydrogen peroxide, or combined systems which contain an organic reducing agent, a peroxide and a small amount of a metal compound which is soluble in the polymerization medium and whose metallic component may occur in a plurality of valence states, for example ascorbic acid/iron(II) sulfate/hydrogen peroxide. Emulsifiers which have proven particularly useful are ethoxylated alkylphenols which have a degree of ethoxylation of from 3 to 30 and where the alkyl radical is of 8 to 10 carbon atoms, the alkali metal salts of their sulfated derivatives and the alkali metal salts of alkylarylsulfonic acids, such as sodium n-dodecylbenzenesulfonate or sodium n-tetradecylbenzenesulfonate. The emulsion polymerization temperature is usually from 0° to 100° C., preferably from 20° to 90° C. The emulsion polymerization can be carried out as a batch process or in the form of a feed process. The feed process, in which some of the copolymerization mixture is initially taken and heated to the polymerization temperature and the remainder is then fed in continuously in separate feeds, one of which contains the monomers in pure or emulsified form, is preferred. The monomers are preferably fed in as an aqueous emulsion. The number average molecular weight of the dispersed polymer is in general from $5.10^3$ to $5.10^6$, preferably from $10^5$ to $2.10^6$. Advantageously, novel aqueous dispersions having a solids content of from 35 to 65% by weight are prepared. They are particularly suitable as binders for the production of nonwovens from mats, to which they impart heat-sealing properties and resistance to washing and cleaning, i.e. in particular high wet strength and a soft feel. When used for binding mats, novel dispersions having a solids content of from 10 to 30% by weight are preferably employed.

The assistants used may include external plasticizers, inert fillers, thickeners, colorants, agents for increasing the aging resistance or flameproofing agents in the conventional amounts. The novel synthetic resin dispersions are suitable for consolidating both mats of natural fibers, such as vegetable, animal or mineral fibers, and mats of synthetic fibers, where the mats may be needle-punched, rolled, shrunk and/or reinforced with yarns. Examples are fibers of cotton, wool, polyamides, polyesters, polyolefins, synthetic cellulose (viscose), rockwool or asbestos fibers. The novel synthetic resin dispersions are also suitable for impregnating and coating sheet-like textile structures which are woven and/or have a mesh structure, as binders for textile print pastes and paper coating slips, as coating materials for films and as finishing agents for textiles.

When used as binders for mats, the novel dispersions can be applied in a conventional manner, for example by impregnation, spraying, coating or printing. The excess binder is then generally removed, for example by squeezing between two rollers running in opposite directions, and the binder-containing mat is dried and then heated for a few minutes, temperatures of from 110° to 200° C., preferably from 120° to 170° C., being generally used. The binder content of the nonwoven is usually from 20 to 60, preferably from 20 to 35, % by weight (based on anhydrous material).

EXAMPLES

Example 1

Preparation of Various Aqueous Synthetic Resin Dispersions

Dispersion 1

A mixture of 390 g of water, 9.6 g of a 30% strength aqueous hydrogen peroxide solution and 48 g of a monomer emulsion D1 was heated to the polymerization temperature of 60° C., after which 10 g of a reducing solution of 2.8 g of ascorbic acid and 0.02 g of iron(II) sulfate in 200 g of water were added all at once. A further 2,377 g of the monomer emulsion D1 and the remainder of the reducing solution were then added continuously in the course of 2 hours, while maintaining the polymerization temperature, and, when the feed was complete, polymerization was continued for a further 2 hours. The solids content of the resulting dispersion was 48% by weight.

Composition of D1:
33.6% by weight of water
29.7 (50)hu * % by weight of vinyl propionate
* The data in parentheses relate to the pure monomer composition.
28.2 (47.5) % by weight of ethyl acrylate
1.5 (2.5) % by weight of acrylamidoglycollic acid
4.4% by weight of emulsifier I and
2.6% by weight of emulsifier II Emulsifier I: 20% strength by weight aqueous solution of ethoxylated p-isooctylphenol (degree of ethoxylation: 25)

Emulsifier II: 35% strength by weight aqueous solution of the Na salt of ethoxylated (degree of ethoxylation 25) and sulfated p-isooctylphenol Dispersion 2

As for dispersion 1, but with the following differences: instead of monomer emulsion D1, a monomer emulsion D2 having the following composition was used:
33.6% by weight of water
25.2 (42.5) % by weight of vinyl acetate
32.7 (55.0) % by weight of n-butyl acrylate
1.5 (2.5) % by weight of acrylamidoglycollic acid
4.4% by weight of emulsifier I and
2.6% by weight of emulsifier II Dispersion 3

As for dispersion 1, but with the following differences the initially taken mixture consisted of 211 g of water, 4.5 g of the hydrogen peroxide solution and 3 g of a monomer emulsion D3. Initially, only 1 g of a reducing solution of 1.35 g of ascorbic acid and 0.008 g of iron(II) sulfate in 100 g of water was added, the amount of continuously introduced monomer mixture D3 was 1,207 g and the composition of D3 was as follows:
37 6% by weight of water
39.3 (70.5) % by weight of vinyl acetate
14.0 (25.0) % by weight of ethyl acrylate
2.5 (4.5) % by weight of acrylamidoglycollic acid
4.2% by weight of emulsifier I and
2.4% by weight of emulsifier II The solids content of the resulting dispersion was 45% by weight.

Dispersion 4

As for dispersion 1, but with the following differences: the initially taken mixture consisted of 381 g of water, 10 g of the hydrogen peroxide solution and 48 g of a monomer emulsion D4. The amount of continuously introduced monomer mixture D4 was 2,363 g and the composition of D4 was as follows:
31.6% by weight of water
31.1 (50.0) % by weight of vinyl propionate
15.6 (25.0) % by weight of ethyl acrylate
14.0 (22.5) % by weight of n-butyl acrylate
1.5 (2.5) % by weight of acrylamidoglycollic acid and
6.2% by weight of a 15% strength by weight aqueous solution of a mixture of equal amounts of Na n-dodecylbenzenesulfonate and Na n-tetradecylbenzenesulfonate.

The solids content of the resulting dispersion was 50% by weight.

Example 2

Investigation of Differently Bound Mats

A) A longitudinally laid (fiber orientation preferentially in one direction, the longitudinal direction) mat of polyester fibers having a length of 60 mm and a mean denier of 3.3 dtex (1 dtex corresponds to a fiber mass of $1.10^{-4}$ g for a fiber length of 1 m) was impregnated in independent experiments with dispersions 1 to 4, which had been diluted beforehand to a standard solids content of 20% by weight, introduced between two rollers running in opposite directions to separate off the excess dispersion and then exposed to a temperature of 150° C. for 4 minutes. The binder content of the resulting nonwovens was 33% by weight in all cases, with a final weight per unit area of 50 g/m². 50 mm wide strips of these nonwovens were then subjected to a strip tension test similar to DIN 53,857, in the dry state, moistened with water and in the state after heat-sealing (sealing conditions: 2 sec, 170° C., 6 bar, sealing area 5 cm², lower surface of one strip sealed against upper surface of another strip) to determine the maximum tensile force (parallel to the preferential fiber direction), the free clamping length being 10 cm. The results are shown in Table 1. Table 1 also contains the results of three Comparative Experiments V1 to V3, in which the novel dispersions were replaced by 20% strength by weight synthetic resin dispersions which had been obtained by diluting dispersions according to Comparative Example B (V1) and K (V2) of the earlier application Ser. No. P 37 34 752.7, and by diluting a dispersion according to Preparation Example 4 from European Patent 19,169 (V3).

TABLE 1

| | Maximum tensile force [N] | | |
|---|---|---|---|
| | Dry | Moist with water | After sealing |
| Dispersion 1 | 107 | 50 | 11 |
| Dispersion 2 | 102 | 46 | 12 |
| Dispersion 3 | 117 | 54 | 21 |
| Dispersion 4 | 86 | 54 | 11 |
| V 1 | 82 | 41 | 1.9 |
| V 2 | 68 | 40 | 2.0 |
| V 3 | 97 | 55 | 0 |

B) As for A), except that the mat consisted of viscose fibers having a length of 40 mm and a mean denier of 2.8 dtex. The results are shown in Table 2.

TABLE 2

| | Maximum tensile force [N] | | |
|---|---|---|---|
| | Dry | Moist with water | After sealing |
| Dispersion 1 | 89 | 46 | 11 |
| Dispersion 2 | 101 | 47 | 13 |
| Dispersion 3 | 98 | 37 | 7 |
| Dispersion 4 | 105 | 44 | 7 |
| V 1 | 73 | 35 | 1.2 |
| V 2 | 74 | 35 | 1 |
| V 3 | 85 | 39 | 0 |

We claim:
1. An aqueous synthetic resin dispersion, obtained by single-stage emulsion polymerization of a monomer mixture consisting of

(a) from 35 to 70.5% by weight of vinyl acetate, vinyl propionate or combinations thereof (monomer A),
(b) 0.5-10% by weight of acrylamidoglycolic acid, methacrylamidoglycolic acid, or combinations thereof (monomer B),
(c) 25-64.5% by weight of at least one monomer selected from the group consisting of acrylonitrile, styrene and esters of an $\alpha,\beta$-monoethylenically unsaturated monocarboxylic acid of 2 to 5 carbon atoms and an alcohol of 1 to 4 carbon atoms (monomer C), and
(d) 0-5% by weight of at least one $\alpha,\beta$-monoethylenically unsaturated mono- and/or dicarboxylic acid of 3 to 5 carbon atoms and/or its unsubstituted amides (monomer D), the weights of monomers A, C, and D being selected within the stated limits so that a polymer composed only of these monomers has a glass transition temperature of $-50°$ to $+60°$ C.

2. A process for the preparation of an aqueous synthetic resin dispersion as claimed in claim 1, consisting of copolymerizing, by single-stage emulsion polymerization, (a) from 35 to 70.5% by weight of vinyl acetate, vinyl propionate or combinations thereof (monomer A),
(b) 0.5-10% by weight of acrylamidoglycolic acid, methacrylamidoglycolic acid, or combinations thereof (monomer B),
(c) 25-64.5% by weight of at least one monomer selected from the group consisting of acrylonitrile, styrene and esters of an $\alpha,\beta$-monoethylenically unsaturated monocarboxylic acid of 2 to 5 carbon atoms and an alcohol of 1 to 4 carbon atoms (monomer C), and
(d) 0-5% by weight of at least one $\alpha,\beta$-monoethylenically unsaturated mono- and/or dicarboxylic acid of 3 to 5 carbon atoms and/or its unsubstituted amides (monomer D), the weights of monomers A, C and B being selected within the stated limits so that a polymer composed only of these monomers has a glass transition temperature of $-50°$ to $+60°$ C.

3. A process for the production of a nonwoven from a mat, comprising: treating said mat with the aqueous synthetic resin dispersion of claim 1 as a binder.

* * * * *